March 13, 1928.
L. REICHOLD
1,662,621
TEMPERATURE INDICATING DEVICE FOR WAFFLE IRONS
Filed Nov. 3, 1927
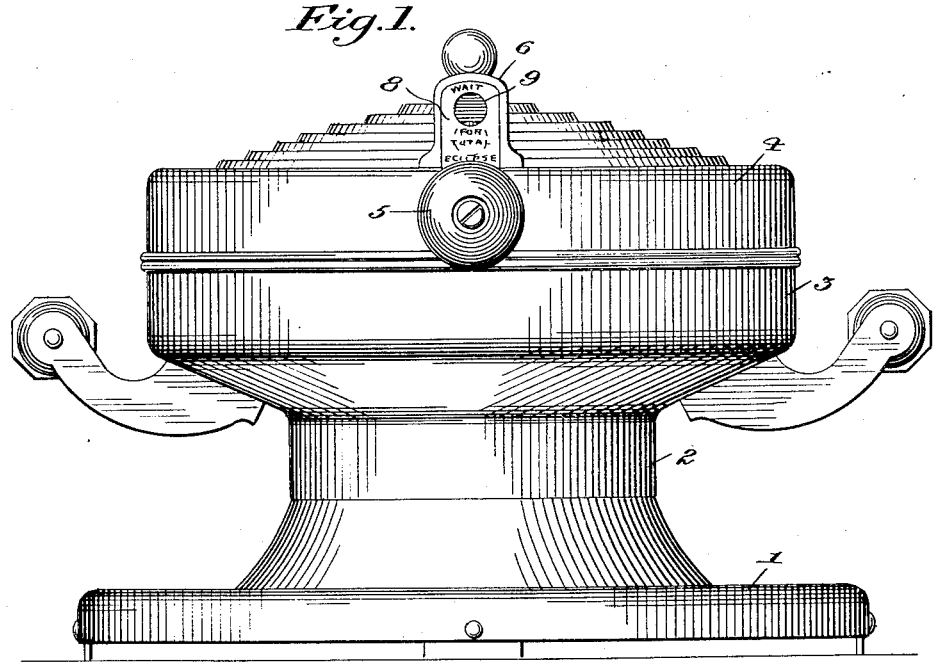
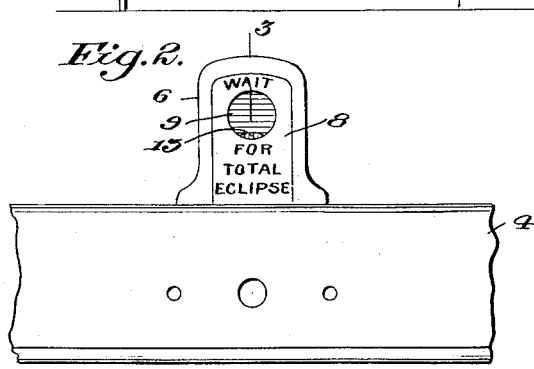
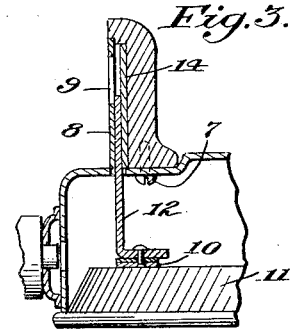
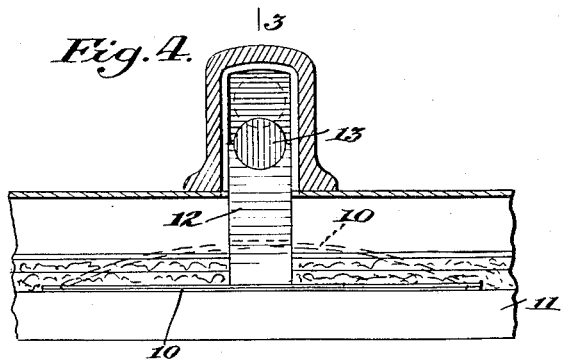
Inventor:
Ludwig Reichold,
By Sturtevant & Mason
Att'ys.

Patented Mar. 13, 1928.

1,662,621

UNITED STATES PATENT OFFICE.

LUDWIG REICHOLD, OF WINSTED, CONNECTICUT, ASSIGNOR TO THE FITZGERALD MANUFACTURING COMPANY, OF TORRINGTON, CONNECTICUT, A CORPORATION OF CONNECTICUT.

TEMPERATURE-INDICATING DEVICE FOR WAFFLE IRONS.

Application filed November 3, 1927. Serial No. 230,784.

The invention relates to new and useful improvements in temperature indicating devices, and more particularly to a temperature indicating device for indicating a desired temperature of a heating element.

An object of the invention is to provide a waffle iron with a temperature indicating device, which shows that the heating element is at a proper temperature for cooking.

A further object of the invention is to provide a temperature indicating device of the above character which is very simple in construction, and wherein a signal member by its position indicates that the heating elements are at proper temperature for cooking.

These and other objects will in part be obvious and will in part be hereinafter more fully disclosed.

In the drawings which show by way of illustration one embodiment of the invention:

Figure 1 is a side view of a waffle iron embodying the improvements, and

Fig. 2 is an enlarged view of a portion of the waffle iron showing the indicating device in front elevation.

Fig. 3 is a sectional view on the line 3—3 of Fig. 2.

Fig. 4 is a transverse sectional view through the indicating device and the waffle iron, and showing the indicating device in side elevation.

The invention is directed to a temperature indicating device for waffle irons, and has for its purpose to devise a signaling means which, by its position relative to an opening in the indicator, shows when the heating elements are at proper temperature for cooking the waffle.

Mounted on the outer face of the upper member of the waffle iron is a housing, having an opening therethrough which is preferably circular in outline. Resting on the heating element of said upper member of the waffle iron is a thermostatic element, centrally of which is a standard or arm which is raised and lowered by the flexing of the thermostat due to the temperature of the heating elements of the waffle iron. At the upper end of this standard or arm is a signaling member preferably circular in outline, and of a diameter corresponding to the opening in the indicator. This signaling member is preferably colored red, although it may be otherwise colored to attract attention.

When the heating element is cold and the thermostat is straight and resting on the heating element, this signaling member is practically concealed within the indicator with its upper edge at the lower side of the opening in the indicator. When heat is generated in the heating elements, the thermostat is flexed and the extent to which it is flexed depends upon the temperature of the heating elements. This thermostat is so proportioned that when these heating elements are at the proper temperature for cooking a waffle, then the signal member fully eclipses the circular opening in the indicator.

Referring more in detail to the drawings, I have shown a waffle iron consisting of a supporting base 1, and a standard 2 on which is mounted the lower member 3 of a waffle iron. Hinged to this lower member 3 is an upper member 4. A handle 5 is provided for raising the upper member 4. The waffle iron as described is of the usual construction, and a detailed description thereof will not be necessary. Mounted on the upper member 4 of the waffle iron is a housing 6 which is secured to the upper member by suitable screws 7. A front plate 8 closes the housing, and this front plate adjacent the upper end thereof is provided with a circular opening 9. Disposed within the upper member 4 of the waffle iron is a thermostat element 10, which consists of two metals of different co-efficients of expansion, and these metals are straight and lie flat upon the heating element 11 of the upper member of the waffle iron. Attached to said thermostatic element 10 is a standard or arm 12. Said standard or arm 12 is rigidly secured to the thermostatic element intermediate the ends thereof. At the upper end of this standard or arm 12 is a circular field 13 which is preferably colored red, and which serves as a signal. This standard 12 extends up into the housing. Fixed within the housing is a backing plate 14, and the standard is located between this backing plate 14 and the front plate 8 of the housing. The backing is preferably colored blue, which by contrast makes the red signaling member stand out so that it is very clearly visible.

The thermostatic element maintains this standard 12 in vertical position. When the thermostat flexes, due to the heating of the waffle iron, the standard will be gradually raised. The extent to which it is flexed depends upon the temperature of the heating elements. This thermostat is so proportioned that when the same is flexed so as to cause the red signaling member to completely eclipse the blue backing visible through the opening in the front wall of the indicator, then the heating elements are at a proper temperature for cooking the waffle.

While I have shown a straight thermostatic element with the signal supported at the center thereof, it will be understood, of course, that this thermostatic element may be changed as to shape and proportions, and that the arm may be otherwise attached thereto. The essential feature consists in the providing of a thermostatic element which is heated at the same time the heating elements of the waffle iron are heated, and is so connected to a signaling member that the signaling member will be properly positioned to indicate the temperature desired in the heating elements for cooking the waffles.

What I claim as new and desire to secure by Letters Patent is:

A temperature indicating device for waffle irons comprising a housing having an opening therein, a movable signal member located within the housing and adapted to move so as to be viewed through the opening, a normally straight thermostatic element resting on the upper face of the heating element of the upper member of the waffle iron, a standard secured to said thermostatic element intermediate its ends and extending up into said housing and carrying said signal member, said thermostatic element and said standard being so proportioned that the signaling member will assume a predetermined position relative to the opening when the heating element is at proper temperature for cooking a waffle.

In testimony whereof I affix my signature.

LUDWIG REICHOLD.